US008893281B1

(12) United States Patent
Lee et al.

(10) Patent No.: US 8,893,281 B1
(45) Date of Patent: Nov. 18, 2014

(54) METHOD AND APPARATUS FOR PREDICTING THE IMPACT OF SECURITY INCIDENTS IN COMPUTER SYSTEMS

(75) Inventors: Thomas Elliott Lee, Los Altos, CA (US); Les Jerome Wilson, Morgan Hill, CA (US)

(73) Assignee: VivoSecurity, Inc.

( * ) Notice: Subject to any disclaimer, the term of this patent is extended or adjusted under 35 U.S.C. 154(b) by 0 days.

(21) Appl. No.: 13/494,067

(22) Filed: Jun. 12, 2012

(51) Int. Cl.
*G06F 21/00* (2013.01)
*G06F 21/56* (2013.01)
*H04L 29/06* (2006.01)

(52) U.S. Cl.
CPC ........... *G06F 21/565* (2013.01); *H04L 63/1433* (2013.01)
USPC .......................................................... 726/25

(58) Field of Classification Search
CPC .... G06F 21/00; G06F 21/565; H04L 63/1433
USPC ................................................... 726/5, 25
See application file for complete search history.

(56) References Cited

U.S. PATENT DOCUMENTS

| | | | | |
|---|---|---|---|---|
| 7,114,185 | B2 * | 9/2006 | Moore et al. | 726/24 |
| 7,188,107 | B2 * | 3/2007 | Moon et al. | 1/1 |
| 7,206,785 | B1 * | 4/2007 | Stephens | 707/602 |
| 8,533,840 | B2 * | 9/2013 | Redlich et al. | 726/25 |
| 2005/0246333 | A1 * | 11/2005 | Hou et al. | 707/5 |
| 2006/0155782 | A1 * | 7/2006 | Berstis et al. | 707/203 |
| 2006/0174123 | A1 * | 8/2006 | Hackett et al. | 713/175 |
| 2011/0197166 | A1 * | 8/2011 | Girgensohn et al. | 715/846 |
| 2012/0131438 | A1 * | 5/2012 | Li et al. | 715/234 |
| 2013/0097705 | A1 * | 4/2013 | Montoro | 726/24 |
| 2013/0145466 | A1 * | 6/2013 | Richard et al. | 726/23 |
| 2013/0227692 | A1 * | 8/2013 | Pavlyushchik | 726/24 |

* cited by examiner

*Primary Examiner* — Hadi Armouche
*Assistant Examiner* — Bryan Wright
(74) *Attorney, Agent, or Firm* — Stephen J. LeBlanc, Esq.

(57) ABSTRACT

Systems or methods gathers information within a network of computers regarding the distribution of documents to calculate the impact of a cyber security incident for a given computer. Specific embodiments analyze word usage within data files and to determine that data files are different versions of a document and use presence of documents on a given computer to determine the impact of a security breach at that computer.

16 Claims, 3 Drawing Sheets

Description of Preferred Embodiment

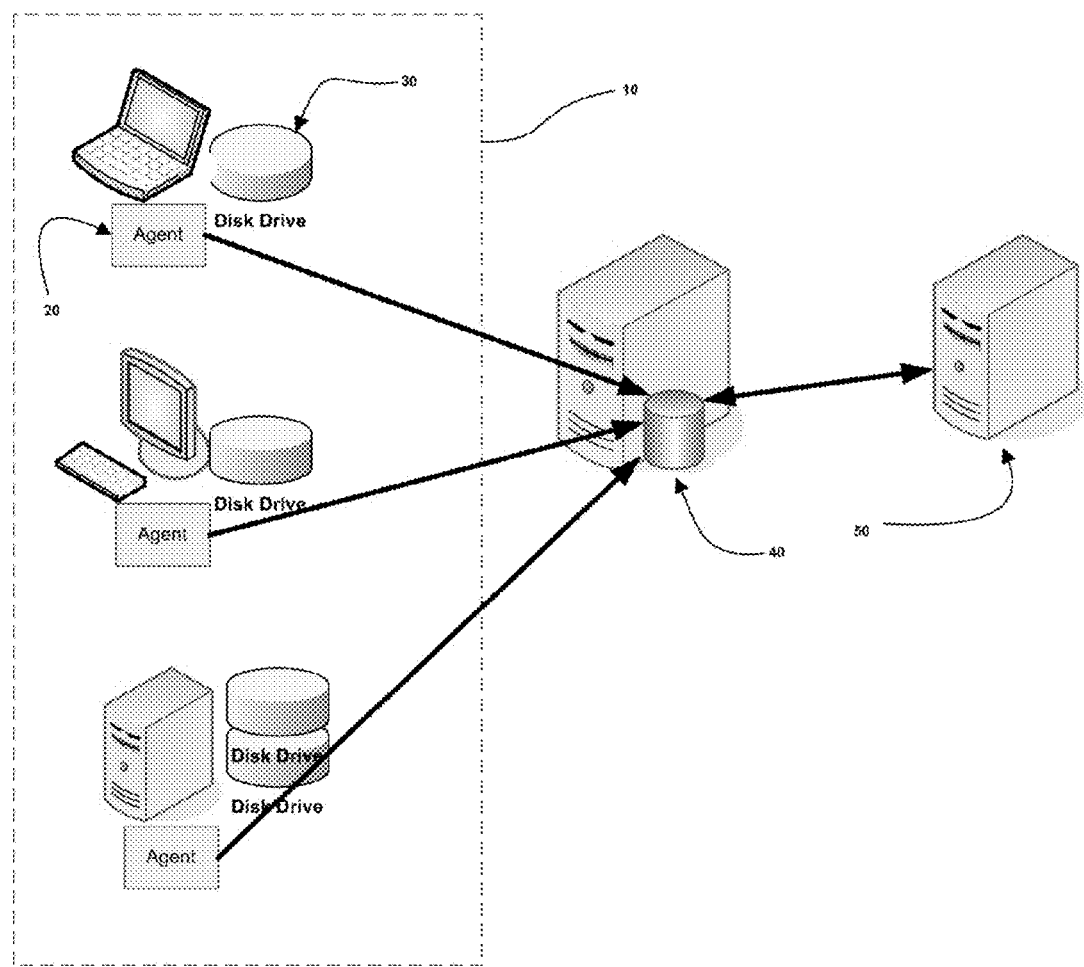
Figure 1, Description of Preferred Embodiment

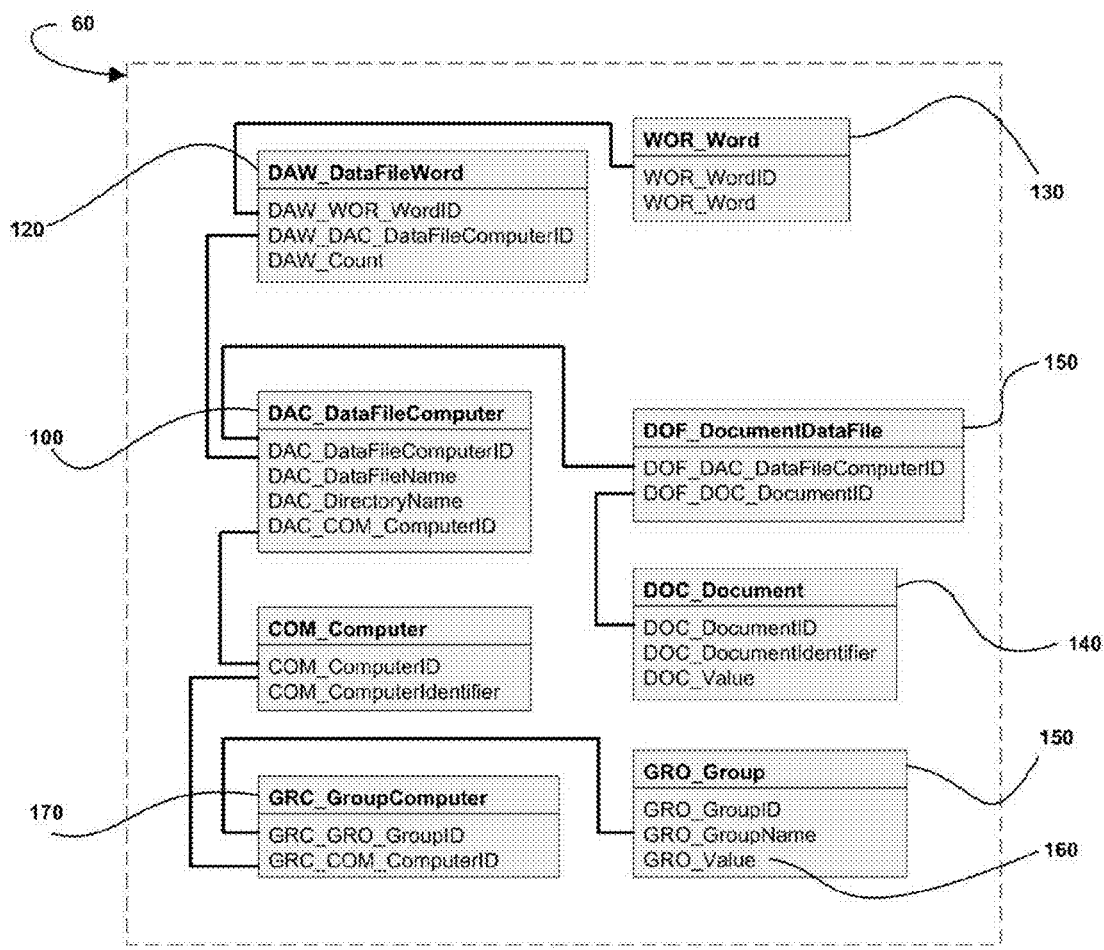
Figure 2, Schema for system database

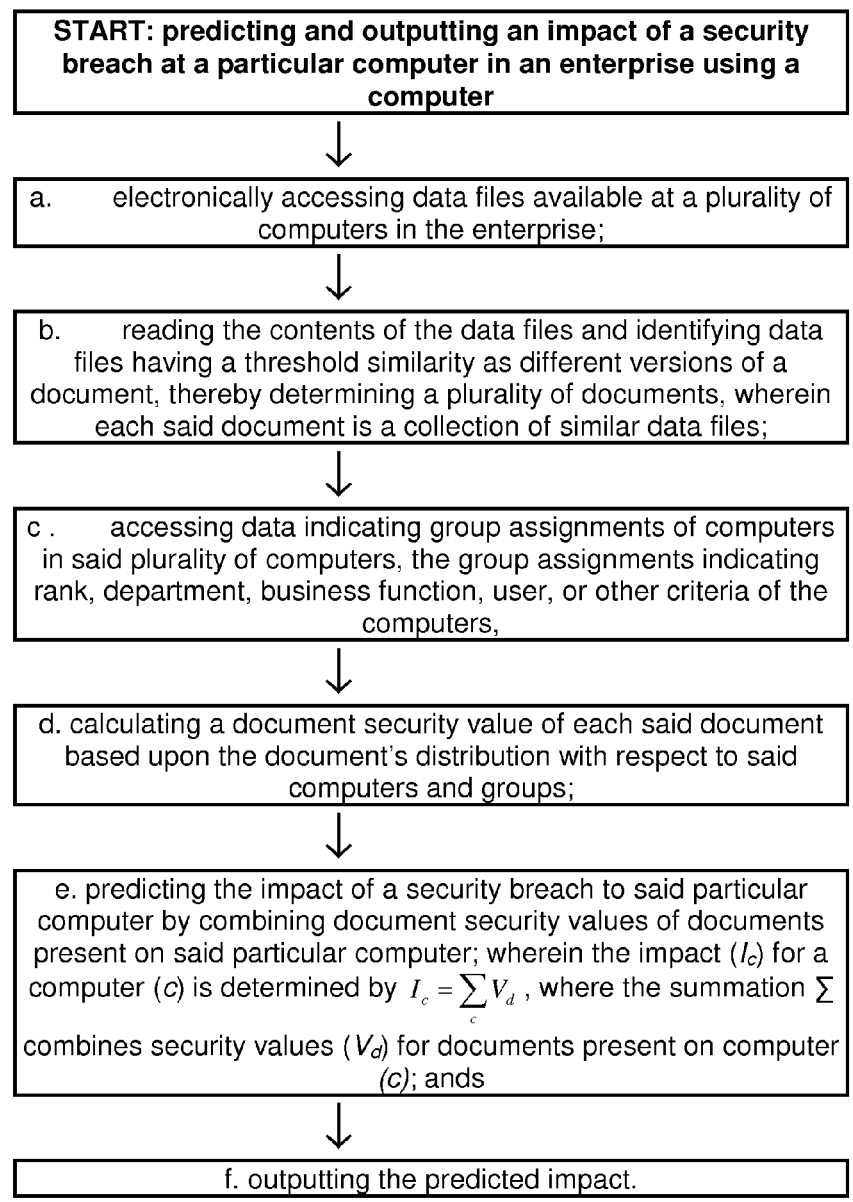
Figure 3, Example Flow Diagram

METHOD AND APPARATUS FOR PREDICTING THE IMPACT OF SECURITY INCIDENTS IN COMPUTER SYSTEMS

BACKGROUND

1. Field of Invention

This invention relates to computer applications which protect a corporate enterprise from security incidents, including unauthorized intrusions and malicious computer programs.

2. Description of Prior Art

The foundation of a good cyber-security policy for any corporate or government enterprise is a security risk assessment: the probability of a security incident and the impact if it were to occur. The amount of risk that can be tolerated and how to mitigate the risk can be determined based upon the risk assessment.

A security risk assessment is difficult to perform, due in part to the difficulty of assessing impact. The impact of a security incident is most often related to the data which could be compromised, and the most difficult data to assess are corporate secrets. Corporate secrets are often located in text documents, digital slide presentations and spreadsheets. It is difficult locating and assessing the value of these documents throughout a large enterprise.

OBJECTS AND ADVANTAGES

Accordingly, we claim the following as our objects and advantages of our invention:
1. To automatically and continuously discover documents within an enterprise,
2. mathematically estimate the value of these documents,
3. Calculate the impact of a security incident for computers with these documents

BRIEF DESCRIPTION OF THE DRAWINGS

FIG. 1, System diagram
FIG. 2, Database Schema of the system.
FIG. 3, Flowchart of an example method.

LIST OF OBJECTS IN FIGURES

10 Computers within the enterprise for which impact is calculated
20 Agent which runs on each computer to read and parse data files
30 Locally attached disk drive with data files to be analyzed
40 Database were data is stored about computers, data files, documents and their values
50 Computer which calculates distance (similarity) between data files, value of documents and impact to computers
60 Schema for database 50
100 Main table for data files linked to computers
120 Linking table between data files and words. Captures the number of times each word can be found in the data file
130 Table of all words found within all data files
140 Document table, which is used to identify data files which are different versions of the same document and assign a value to the document,
150 Group table, which is used to identify a group of computers defined by their user's rank, department or business function,
160 Value of a group

DESCRIPTION OF THE PREFERRED EMBODIMENTS

Impact of a security breach is calculated by analysis of data files present on computers within an enterprise 10. Each computer has a program agent 20 which reads data files on disk drives 30 attached to the computer. The agent maybe a Windows NT Service in the case of a Windows operating system, or a demon in the case of a Linux operating system. The agent performs an analysis of words and sends the information to a database 40 with schema 60. A computer 50 reads the information in the database, determines the distribution for each document, calculates values for each documents based upon its distribution, calculates the impact for each computer with an agent, and saves the information back into the database. Impact and document values for each computer can then be read from the database in order to perform a risk assessment.

Operation

The invention calculates impact of a security breach in the three steps: 1) analyze word usage to identify different versions of the same documents, 2) analyze the distribution of documents to predict their value and 3) add together the value of all documents on a computer to predict the impact of a cyber security breach. Documents include all data files which can contain words such as text documents like Microsoft Word, electronic slides such as Microsoft PowerPoint and spreadsheets such as Microsoft Excel.

Identification of Documents Through Analyze of Word Usage

As documents circulate within an enterprise, they may undergo revision and modification. In order to accurately assess the distribution of a document, all versions of a document must be recognized as the same document. Analysis of word usage is used to identify all versions of a document.

To perform word usage analysis, each new data file is read and the file name is recorded in table 100, along with the directory and a link to the computer; words in the document are parsed and the number of times each word appears is counted and recorded 120. Note that all words across all documents are recorded 130, and each document will have a value for every word, with a value of zero for words which cannot be found in the document.

The distance, a measure of similarity, between data files is calculated using equation 1a and 1b. Equation 1a calculates the normalizing value $N_f$ which is the sum of the word count for all words in data file f, and where $w_f$ is the number of times word w is found in data file f. Equation 1b calculates $D_{n,m}$ which is the distance between data files n and m. Data files which are within some threshold distance from one another are presumed to be the same document. Note that $N_f$ therefore becomes $N_m$ and $N_m$ in equation 1b.

$$N_f = \sum_f w_f \qquad \text{Equation 1a}$$

$$D_{n,m} = \sqrt{\Sigma\left(\frac{w_n}{N_n} - \frac{w_m}{N_m}\right)^2} \qquad \text{Equation 1b}$$

By using equation 1b, to find similar data files within the enterprise, data files can be organized into documents in the database, to determine their distribution and subsequently their value. Following are the steps to organize data files together into documents. Note that distance $D_{n,m}$ in equation 1b is calculated in step 5.

Steps to Organize Data Files into Documents

| Step | Activity |
| --- | --- |
| 1 | Delete all rows in the following tables: DOC_Document (140) and DOF_DocumentDataFile (150) |
| 2 | Fetch the next data file from DAC_DataFileComputer (100), or end if no more data files. |
| 3 | Go to step 2 if data file is already attached to a document in the table DOC_Document (140) through linking table DOF_DocumentDataFile (150) |
| 4 | Insert a new row in table DOC_Document (140) and a linking row in table DOF_DocumentDataFile (150) |
| 5 | Find all data files which are within the distance threshold and link these to the row in table DOC_Document from step 3 by adding a linking row in DOF_DocumentDataFile (150) |
| 6 | Go to step 2 |

The Equations 1a and 1b can be implemented with database schema 60 by using SQL 1a and 1b, were SQL 1a can be used to calculate the normalizing values in equation 1a or variables @N and @M used in SQL 1b, and where SQL 1b can be used to calculate distance between data files @DataFile_n and @DataFile_m.

```
SQL 1a:
    Normalizing value N_f and values @N and @M in SQL 1b
    SELECT
        SUM(DAW_Count)
    FROM
        DAW_DataFileWord
    WHERE
        DAW_DAC_DataFileComputerID=@DataFile
SQL 1b:
    Distance value D_{n,m} between data files n and m
    SELECT
        SQRT(SUM(SQUARE(n.DAW_Count/@N-m.DAW_Count/@M)))
    FROM
        DAW_DataFileWord
            INNER JOIN DAC_DataFileComputer n
                ON DAW_DAC_DataFileComputerID=n.DAC_DataFileComputerID
            INNER JOIN DAC_DataFileComputer m
                ON DAW_DAC_DataFileComputerID=m.DAC_DataFileComputerID
    WHERE
        n.DAW_WOR_WordID=m.DAW_WOR_WordID
        AND n.DAW_DAC_DataFileComputerID=@DataFile_n
        AND m.DAW_DAC_DataFileComputerID=@DataFile_m
```

Calculate Document Value Based on Distribution

In order to calculate the value of documents, computers within an enterprise are organized into groups, where each computer is assigned to one or more groups. Groups may be departments within an organization such as the Human Resource department (HR), but they may also be artificial collections such as the most senior staff of a corporation, the CEO, CFO, CIO, CTO and COO (CXO). Groups are assigned values according to the value of documents they might produced. For example, the CXO group will have a higher value than the HR group since the CXO group is more likely to produce documents with company secrets.

In the database schema (60), groups are created in the GRO Group table (150) with their assigned values (160), and computers are organized into groups through the linking table GRC GroupComputer (170).

The value $V_{d,g}$ of a document d is calculated for each group g according to equation 2a, where $K_g$ (160) is the value for group g, $N_{d,g}$ is the number of computers in group g where document d has appeared, and the denominator of equation 2a is the greater of two values N the total number of computers across all groups where the document has appeared or $M_g$ the total number of computers within group g. The affect of the denominator in equation 2a is to devalue documents which are widely distributed or documents which are not distributed at all.

$$V_{d,g} = K_g \times \frac{N_{d,g}}{(N \vee M_g)} \qquad \text{Equation 2a}$$

Each document therefore has a value for each group, with a value of zero for groups where the document does not appear. Equation 2b, assigns to document d a final value which is the highest value found for this document across all groups. This value is recorded in the DOC_Value column of database table DOC Document (140).

$$V_d = \text{Max}_d(V_{d,g}) \qquad \text{Equation 2b}$$

The value $V_{d,g}$ for each document can be calculated with schema 60 by using SQL 2a-2c, where output from SQL 2a is the value $N_{d,g}$, the output from SQL 2b is the value $M_g$, and the output from SQL 2c is the value N.

```
SQL 2a:
    Computers (N_g) in group=@Group which have document=@Document
    SELECT
        DISTINCT COM_ComputerID
    FROM
        DOC_Document
            INNER JOIN DOF_DocumentDataFile
                ON DOF_DOC_DocumentID=DOC_DocumentID
            INNER JOIN DAC_DataFileComputer
                ON DAC_DataFileComputerID=DOF_DAC_DataFileComputerID
            INNER JOIN GRC_GroupComputer
                ON DAC_COM_ComputerID=GRC_COM_ComputerID
    WHERE
        GRC_GRO_GroupID=@Group
        AND DOC_DocumentID=@Document
SQL 2b:
    Total Computers(M_g) in group=@Group
    SELECT
        COUNT(GRC_COM_ComputerID) AS Mg
    FROM
        GRC_GroupComputer
    WHERE
        GRC_GRO_GroupID=@Group
SQL 2c:
    Total Computers (N) in all groups with document=@Document
    SELECT
        DISTINCT COM_ComputerID
    FROM
        DOC_Document
            INNER JOIN DOF_DocumentDataFile
                ON DOF_DOC_DocumentID=DOC_DocumentID
            INNER JOIN DAC_DataFileComputer
                ON DAC_DataFileComputerID=DOF_DAC_DataFileComputerID
    WHERE
        DOC_DocumentID=@Document
```

Calculate Impact Based Upon Documents Present

Finally, the impact $I_c$ of cyber security incident for a computer c can be calculated using equation 3, which sums the value of documents present on that computer.

$$I_c = \sum_c V_d \quad \text{Equation 3}$$

Impact $I_c$ for each computer can be calculated with schema 60 by using SQL 3.

```
SQL 3:
    SELECT
        SUM(GRO_Value) AS Impact
        , COM_ComputerIdentifier
    FROM
        COM_Computer
            INNER JOIN DAC_DataFileComputer
                ON DAC_COM_ComputerID=COM_ComputerID
            INNER JOIN DOF_DocumentDataFile
                ON DOF_DAC_DataFileComputerID=DAC_DataFileComputerID
            INNER JOIN DOC_Document
                ON DOF_DOC_DocumentID=DOC_DocumentID
    GROUP BY
        COM_ComputerIdentifier
```

What is claimed:

1. A computer implemented method for predicting and outputting an impact of a security breach at a particular computer in an enterprise comprising:
   a. electronically accessing data files available at a plurality of computers in the enterprise;
   b. reading the contents of the data files and identifying data files having a threshold similarity as different versions of a document, thereby determining a plurality of documents, wherein each said document is a collection of similar data files;
   c. accessing data indicating group assignments of computers in said plurality of computers, the group assignments indicating rank, department, business function, user, or other criteria of the computers,
   d. calculating a document security value of each said document based upon the document's distribution with respect to said computers and groups;
   e. predicting the impact of a security breach to said particular computer by combining document security values of documents present on said particular computer; wherein the impact ($I_c$) for a computer (c) is determined by $I_c = \Sigma_c V_d$, where the summation $\Sigma$ combines security values ($V_d$) for documents present on computer (c); ands
   f. outputting the predicted impact.

2. The method of claim 1 further comprising:
calculating similarity between said data files based upon distance between said data files within a space defined by word dimensions, where the value of a data file in a word dimension is the number of times the word or a variation is found in said data file.

3. The method of claim 1 further comprising:
determining a final security value ($V_d$) for a document (d) by:
$V_d = \text{Max}_d(V_{d,g})$, where $V_{d,g}$ is the value for document d in group g, and is determined by $$V_{d,g} = K_g \times \frac{N_{d,g}}{(N \vee M_g)}$$

where $K_g$ is a weighting value for the group g, $N_{d,g}$ is the number of computers in group g where document d is present, N is the total number of computers across all groups where the document is present, and $M_g$ is the total number of computers in group g.

4. The method of claim 2 wherein the distance function comprises:

$$D_{n,m} = \sqrt{\Sigma\left(\frac{w_n}{N_n} - \frac{w_m}{N_m}\right)^2}$$

where $D_{n,m}$ is a distance between data files n and m and where $w_n$ and $w_m$ are the number of times a word w appears in said data file n and m, and where $N_n$ and $N_m$ are values for said data file n and m, calculated with the equation:

$$N_f = \sum_f w_f,$$

which is the sum of all words in said data file f.

5. The method of claim 1 further comprising:
automatically and continuously discovering new data files and new documents within the enterprise.

6. A computer implemented method for predicting and outputting an impact of a security breach at a particular computer in a computer enterprise comprising:
accessing data files on a plurality of computers in the enterprise;
identifying data files having a threshold similarity as different versions of a document by reading and comparing data file contents and storing document identifiers for documents;
accessing group assignments of said computers, the group assignments assigning a computer to one or more of a plurality of groups, a particular group indicating rank, department, business function, user, or other criteria related to the computers;
calculating a document security value of a document based upon the document's distribution within the enterprise;
determining the impact of a security breach to said particular computer by combining document security values of documents present on said particular computer; wherein the impact ($I_c$) for a computer (c) is determined by $$I_c = \sum_c V_d,$$

where the summation $\Sigma$ combines security values ($V_d$) for documents present on computer (c); and
outputting the impact.

7. The method of claim 6, further wherein:
accessing data files comprises reading data files from storage operatively connected to said computers.

8. The method of claim 6, further comprising:
calculating similarity between said data files based upon distance between said data files within a space defined by word dimensions, where the value of a data file in a word dimension is the number of times the word is found in said data file.

9. A system for predicting and outputting an impact of a security breach at a particular computer in a computer network comprising: a computer processor, a computer application for accessing data files at a plurality of computers in the network and identifying data files having a threshold similarity as different versions of a document by comparing data file contents;

a documents computer application for storing and receiving identifications of a plurality of documents and a plurality of data files representing different versions of the documents;

a groups computer application for storing and receiving identifications of a plurality of computer groups and a plurality of computer devices identifications of computer devices assigned to each group;

wherein groups indicate department, business function, user, user rank, user security level, etc., or other criteria related to the computers; a document security value determination computer application for calculating a document security value of a document based upon the document's distribution; and an impact prediction computer application for determining impact of a security breach to a particular computer by combining document security values of documents available at the particular computer, wherein the impact computer application comprises a table for data files linked to computers;

a linking table for storing the number of times each word can be found in a data file; a word table listing all parsed words found within all data files: a document table used to identify data files that are different versions of the same document and to store a security value for the document;

and a group table used to identify assignments to a plurality of groups indicating computer devices' user's rank, department or business function, and for storing a value of a group.

10. The system of claim 9 further comprising:
a plurality of agents running on a plurality of said computers devices to read data files.

11. The system of claim 9 further comprising:
a database having a schema for storing data about computers, data files, documents and their values; and an analysis computer for calculating distance similarity between data files, values of documents, and impacts to computers.

12. A computer implemented method for assessing impact of a security breach in an enterprise security risk assessment comprising:
reading data files available at computers in the enterprise;
identifying one or more documents by grouping similar data files;
accessing group assignments for the computers in the enterprise;
accessing group security values for the group assignments;
determining a security value for a document by identifying computers with access to the document and group assignments for those computers; and
determining a security breach impact for a computer from the security values of documents accessible by that computer further comprising:
calculating the impact of a security breach by:
1) analyzing word usage to identify different versions of the same documents;
2) analyzing the distribution of documents to predict their value; and
3) adding together the value of all documents on a computer to predict the impact of a cyber security breach.

13. The method of claim 12 further comprising automatically and continuously:
discovering data files and documents within the enterprise by said reading and said identifying;
estimating mathematically the security value of the documents; and
calculating the impact of a security incident for computers with access to the documents based on the security values of the documents.

14. The method of claim 12 further wherein:
security incidents comprise unauthorized intrusions and malicious computer programs;
said enterprise is a corporate or government enterprise; and
said enterprise is a large enterprise.

15. The method of claim 12 further comprising:
using a software application agent at one or more of said computers to read data files available to said computers.

16. The method of claim 12 further comprising:
determining impact of a security incident by accessing data that could be compromised at a particular computer;
wherein said assessing data that could be compromised comprises assessing secrets located in data files such as text documents, digital slide presentations and spreadsheets and locating and assessing the value of these data files throughout a large enterprise by assessing the distribution of documents to grouped computers in the enterprise.

* * * * *